United States Patent [19]

Kirkman et al.

[11] 4,305,747
[45] Dec. 15, 1981

[54] MULTIPLE GOB GLASS FEEDER SYSTEM AND METHOD OF OPERATION

[75] Inventors: Richard T. Kirkman, Maumee, Ohio; James E. Sherman, Temperance, Mich.

[73] Assignee: Owens-Illinois, Inc., Toledo, Ohio

[21] Appl. No.: 166,224

[22] Filed: Jul. 7, 1980

[51] Int. Cl.³ ............................................. C03B 7/08
[52] U.S. Cl. ...................................... 65/128; 65/129; 65/327; 65/330
[58] Field of Search .................. 65/128, 129, 133, 327, 65/330, 332

[56] References Cited

U.S. PATENT DOCUMENTS

| | | | |
|---|---|---|---|
| 2,817,695 | 12/1957 | Hartwig | 65/128 X |
| 3,160,492 | 12/1964 | Chapman et al. | 65/128 |
| 3,558,296 | 1/1971 | Bracken | 65/128 |
| 3,625,671 | 12/1971 | Schrim et al. | 65/128 X |

Primary Examiner—Arthur D. Kellogg

Attorney, Agent, or Firm—E. J. Holler; M. E. Click; D. H. Wilson

[57] ABSTRACT

A molten glass feeder system and method of controlling the flow of glass through the feeder to deliver a plurality of uniform, molten glass gobs. The feeder has a heavy-walled bowl structure and a heavy-walled bottom transitional member mounted within the lower region of the feeder bowl, the transitional member having substantial height with a circular passageway at its upper region and an elongated slot passageway at its lower region, and an elongated discharge orifice member having a plurality of three or more, and preferably three to six, discharge orifices in lineal alignment with the elongated slot passageway. The feeder permits the simultaneous formation and delivery, when coupled with suitable glass shearing mechanism, of more uniform plural glass gobs having similar weight, temperature and heat characteristics to multiple-cavity gob-fed glass forming machines.

17 Claims, 11 Drawing Figures

MULTIPLE GOB GLASS FEEDER SYSTEM AND METHOD OF OPERATION

BACKGROUND OF THE INVENTION

The present invention is directed to a multiple gob glass feeder system for feeding from three to six uniform streams of molten glass for severance into individual, uniform gobs for delivery to an individual section, multiple-cavity forming machine, for example. One example of a double gob feeder is disclosed in U.S. Pat. No. 2,310,290, while an example of a triple gob feeder is disclosed in U.S. Pat. No. 3,516,812.

When producing triple gobs so that containers may be made three at a time, control of flow of the center stream has presented a problem due to the center stream being hotter than the other outboard streams. Thus, the center stream normally flows faster and as a result the glass gob delivered from the center stream is greater in weight and temperature as compared with the gobs from the outboard streams. The aforesaid U.S. Pat. No. 3,516,811 is directed to method and apparatus for cooling the center stream to cause the three streams to flow at the same rate to achieve uniformity of weight in the gob froom three or more uniform streams of molten glass for severance into precisely-similar molten gobs has been a continuing problem in the art, and the cooling and shielding of the center stream in such triple gobbing operation has not adequately solved long-term operating difficulties. Also, the art has had considerable difficulty delivering four or more streams of molten glass with any appreciable degree of uniformity to permit quadruple or greater gob delivery operations.

U.S. Pat. No. 3,558,296 to Bracken discloses a triple gob glass feeder with a heat reflecting shield at the feeder spout. U.S. Pat. No. 3,560,188 to Winzer discloses a hinged orifice plate which is internally cooled to deliver plural gobs. U.S. Pat. Nos. 3,582,309 and 3,711,266 to Bracken and Daly, respectively, disclose triple gob feeders which utilize three plungers in alignment which operate over each of three discharge orifices. While each of these disclosures has attempted to solve the inherent difficulties in triple gob delivery, none has provided the required accuracy and simplicity for triple or quadruple, uniform gob delivery for most modern individual section glass forming machines operating at high rates of production.

SUMMARY OF THE INVENTION

In accordance with the present invention, a greater head of molten glass is provided over a multiple orifice discharge member with a transitional tubular passageway member being provided intermediate the feeder bowl and the discharge orifices. A transitional member is preferably comprised of a heavy-walled, tubular member having a relatively-small circular cross-sectional passageway at its upper region and an elongated slot passageway at its lower region just above the multiple-opening discharge orffice member. Such transitional member is provided with zonal heating elements to control heat loss through its varying wall thickness and is thus able to maintain uniform thermal conditions within the contained molten glass during its delivery in a plurality of streams. The combined apparatus utilizes a single, vertically-reciprocatable plunger mounted within the feeder bowl area which is surrounded by a single cylindrical tube having a diameter complemental to the upper circular passageway of the transitional member. The present apparatus and method offer substantial advantages in simplicity, novel construction and smooth operation which eliminate the need for multiple plungers and their attendant adjustment problems. The subject apparatus employs a single plunger and single tube arrangement and a distinctively-shaped transition portion between bowl and orifice plate to ensure smooth, uniform, downward flow and positive control of thermal conditions.

It is an object of the present invention to provide a multiple gob glass feeding system for feeding more uniform gobs of glass to multiple-cavity glass forming machines, the gobs being very precisely similar in weight, shape and thermal condition properties.

Another object of the present invention is to provide a multiple-gob glass feeder which is heavily insulated wherein the molten glass is passed downwardly through a tubular, heavy-walled, transitional member having a circular to elongated slot cross-section toward a lineal series of discharge orifices. The bowl structure and the transitional member have supplemental heating elements to precisely maintain and control glass temperatures therewithin.

Still another object of the present invention is to provide a method for delivering three or more gobs of molten glass with each gob being uniform in size, weight and temperature for increased demands of modern, high-speed forming machines.

The invention will be described in greater detail by means of an example of its embodiment shown in the accompanying drawings.

DESCRIPTION OF THE PREFERRED EMBODIMENT

Figure 1:
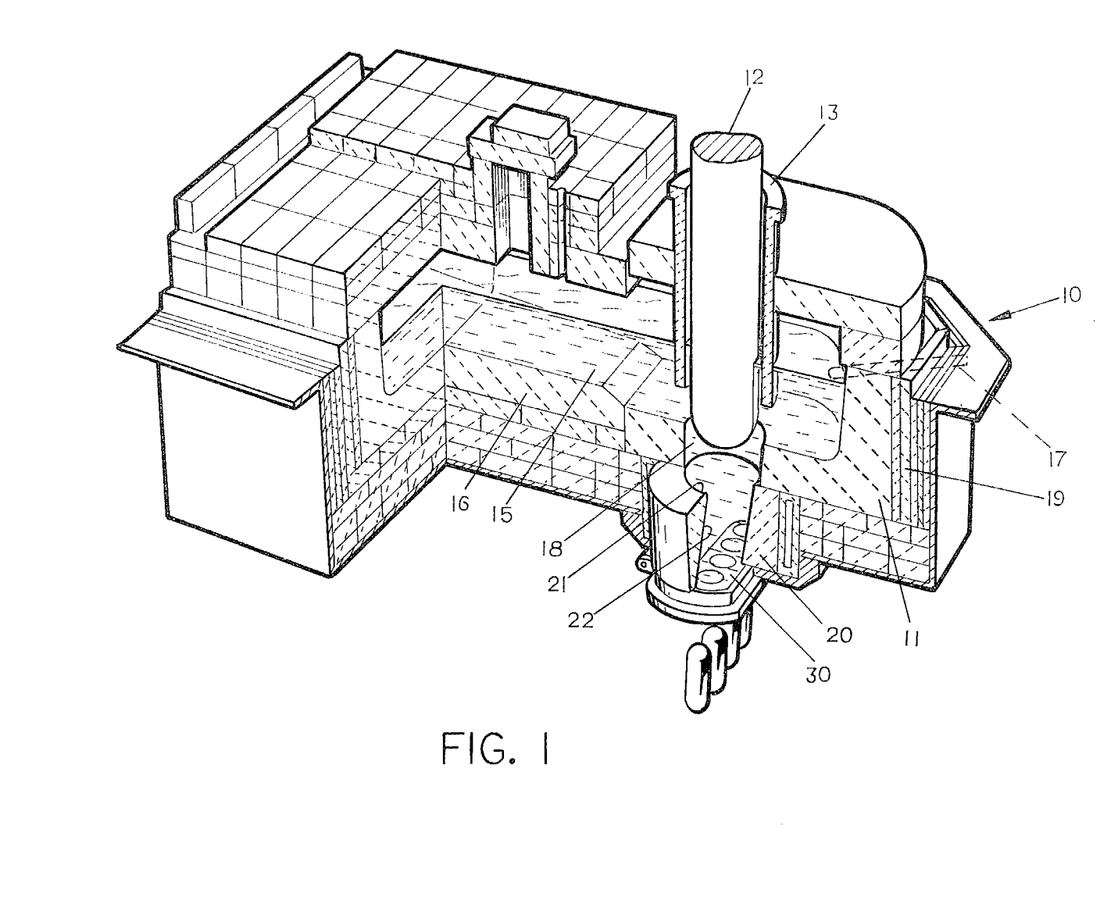
FIG. 1 is a fragmentary, perspective view of the glass feeder system partly in cut-away section.

Referring to the drawings in detail wherein like members indicate like elements, there is shown in FIG. 1 a molten glass feeder 10 from which the glass discharges in a controlled manner. The feeder includes a bowl portion 11 which is preferably heavy walled on all sides and insulated to minimize heat loss to its surroundings. The bowl is preferably comprised of refractory material for long-term use while delivering the molten glass. The feeder also includes a single cylindrical plunger 12 which is vertically mounted centrally within the bowl to control the glass flow through the discharge area of the feeder. The plunger is vertically reciprocatable to control such flow by hydraulic action. The plunger is mounted within a cylindrical refractory tube 13 which is provided with conventional mounting structure (not shown) for rotating the tube about its longitudinal axis. Normally, the tube is continuously rotated during operation of the feeder, while tube and plunger have coincidental central axes. One type of conventional structure for rotating the tube 13 is disclosed in U.S. Pat. No. 2,310,290.

As shown in FIG. 1, the heated molten glass 15 which passes into the feeder is conveyed thereinto from a forehearth 16 connected to the refiner section of a glass melting furnace. The glass flows into the feeder bowl 11 in properly refined and uniform thermal condition for forming or other end use. Bowl portion 11 has a series of electrodes 17 mounted in spaced-apart horizontal relation extending through the bowl sidewall. The electrodes are mounted in a radial pattern projecting into the molten glass surrounding tube 13. Electrical leads (not shown) are connected to each of the electrodes from an electrical power source to deliver electrical energy for heating the glass. One or more of the electrodes may be energized individually or combinedly to locally heat the glass in the bowl to attain more uniform temperature within the glass mass when a thermal imbalance is encountered.

The bowl 11 has a circular discharge aperture 18 in a central bottom region in vertical alignment with plunger 12 and hollow rotary tube 13. The molten glass in thermally stable condition and having a uniform viscosity is then delivered through the discharge aperture 18. The bowl structure is normally surrounded by a suitable layer or layers of insulating material 19 over all exteriorly-exposed surfaces to minimize heat losses to its surroundings.

Figure 2:
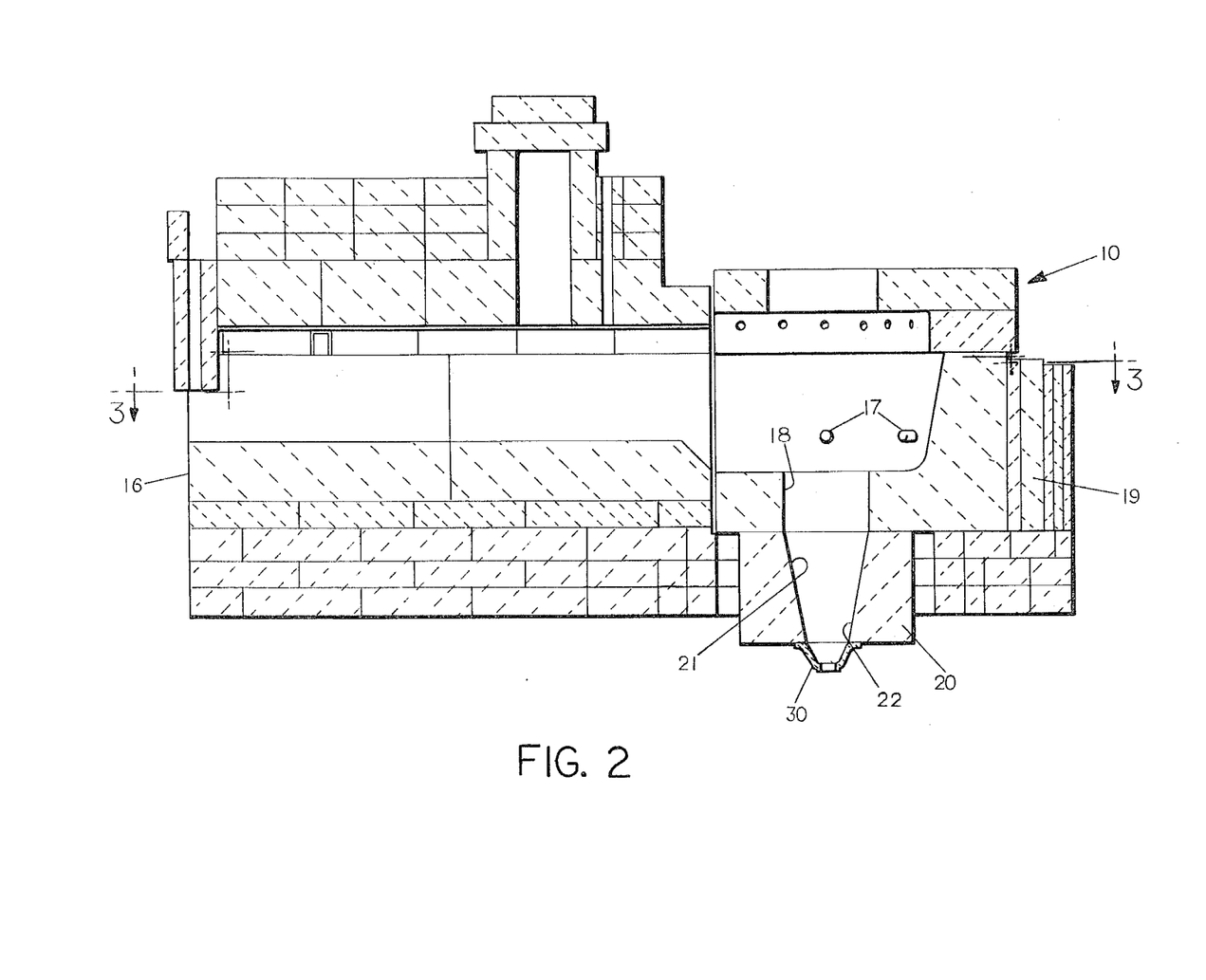
FIG. 2 is a vertical sectional view of the feeder system taken along the center line of the apparatus as shown in FIGS. 1 and 3.

As shown in FIGS. 1 and 2, a heavy-walled transitional member 20 which is tubular in nature is mounted beneath the bowl discharge aperture 18. Transitional member 20 has a circular aperture passageway 21 at its upper region which is attached to the underside of the bowl, the bowl aperture 18 and upper circular aperture 21 of the transitional member having precisely-similar diameters. Transitional member 20 has an elongated slot passageway 22 at its lower region, the cross-sectional are of the tubular passageway of the transitional member progressively decreasing from top to bottom in a downward direction. The decrease in area is of the order of about 10 percent, i.e., the elongated slot lower area being about 90 percent of the area of the upper circular aperture. The transition downwardly from circular passageway to elongated slot passageway is preferably limited to a maximum angular slope of not greater than about 15 degrees from vertical. The transition member has sufficient vertical height to permit such angular sloping from circular to elongated slot passageway.

Figure 3:
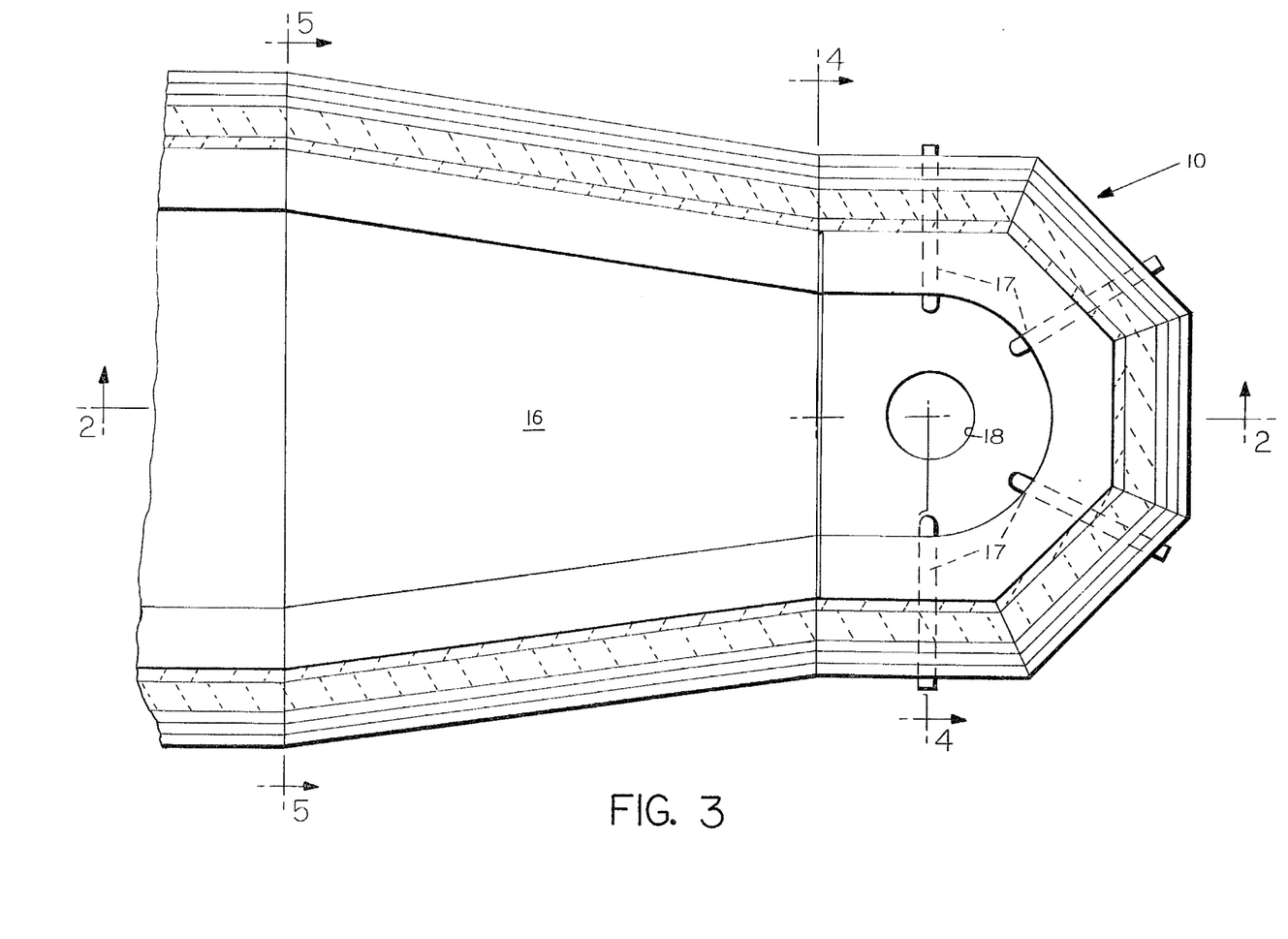
FIG. 3 is a horizontal sectional view of the feeder system taken along the line 3—3 of FIG. 2.
Figure 4:
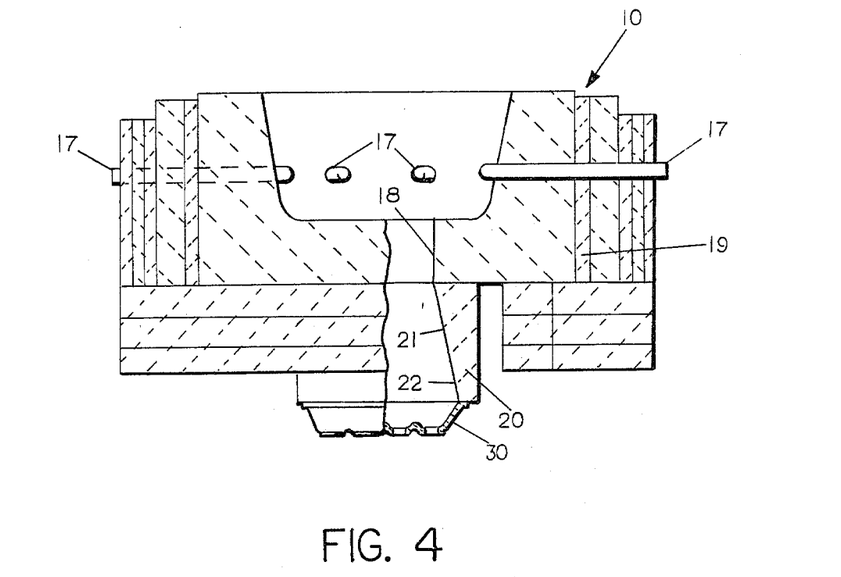
FIG. 4 is a vertical sectional view of the feeder system taken along the line 4—4 of FIG. 3.
Figure 5:
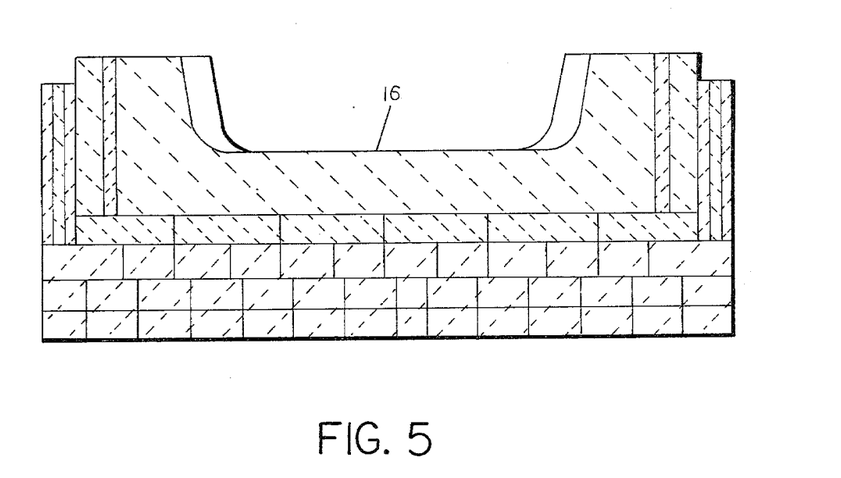
FIG. 5 is a vertical sectional view of the forehearth area of the feeder system taken along the line 5—5 of FIG. 3.

Transition member 20 has a heavy wall structure and is preferably comprised of refractory ceramic material to minimize heat loss through its sidewalls. The exterior surfaces of this member are surrounded by a series of upright, plate-type, electrical heating elements 25 mounted in a radial pattern which serve to maintain uniform thermal conditions within transition member 20 during downward passage of the glass. Each of the heating elements 25 is connected to an electrical power source for delivering electrical energy thereto. As shown in FIG. 3, transition member 20 may also be surrounded by a layer 26 of insulating material such as high-temperature ceramic mounted exteriorly of the electrical heaters to further reduce heat losses.

Figure 6:
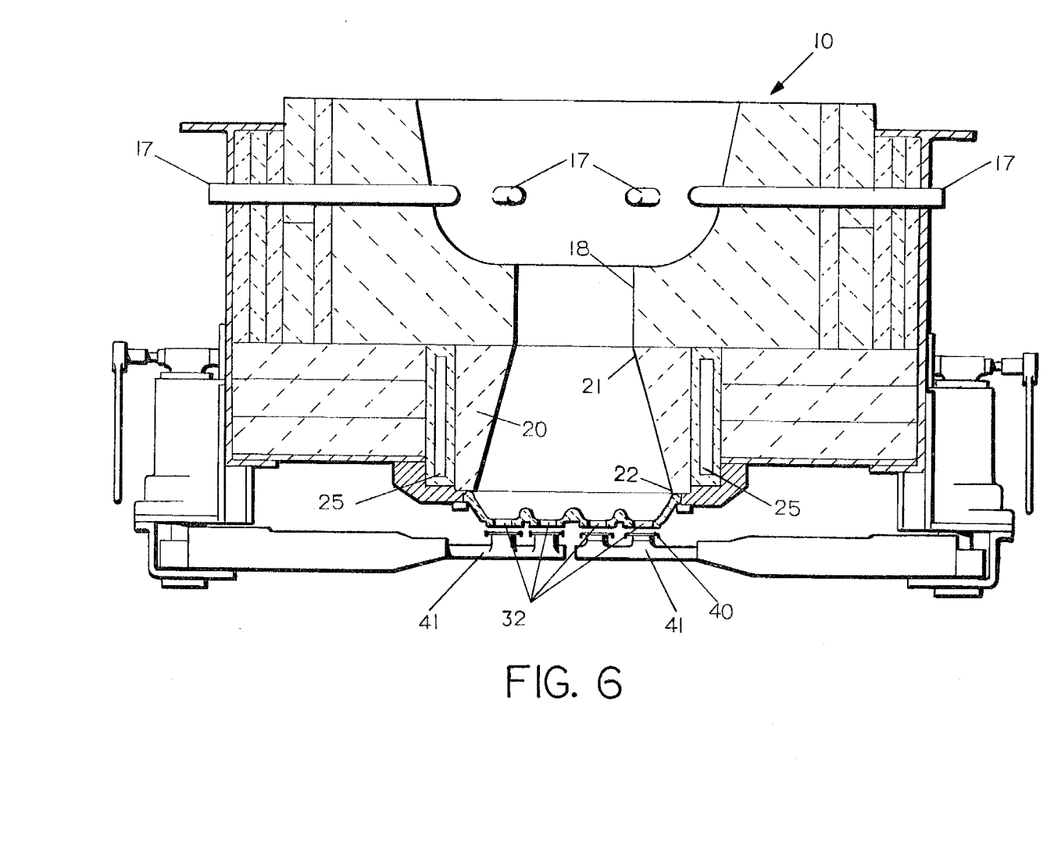
FIG. 6 is a further enlarged, vertical sectional view of the feeder bowl, delivery orifice and shearing mechanism areas of the system similar to FIG. 4.
Figure 7:
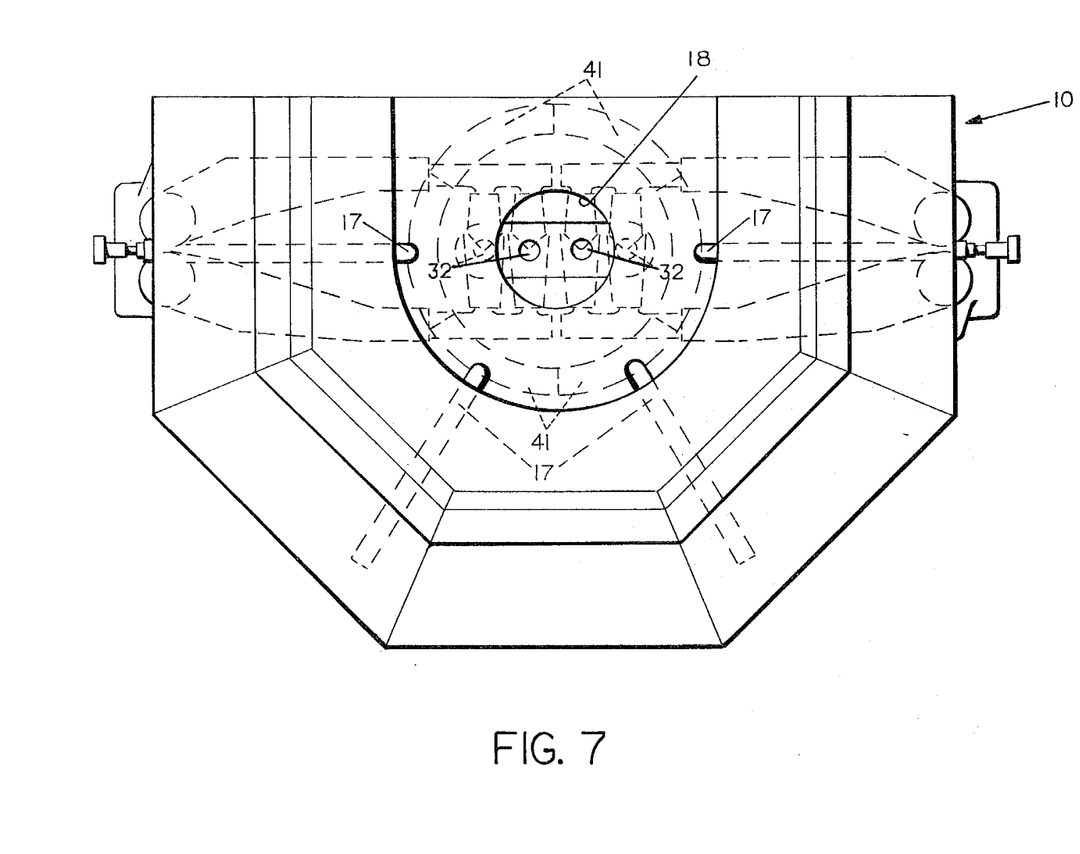
FIG. 7 is a further enlarged fragmentary, horizontal sectional view of the feeder bowl, delivery orifice and shearing mechanism areas of the system simliar to FIG. 3.
Figure 8:
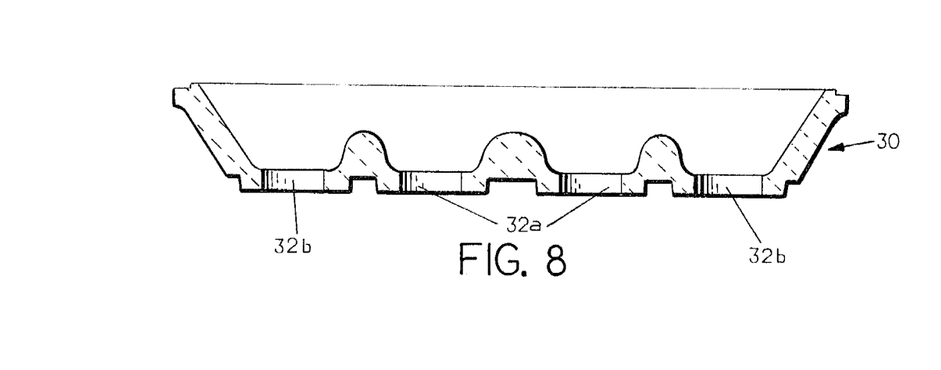
FIG. 8 is a further enlarged fragmentary, vertical sectional view of the multiple orifice member of the system shown in FIGS. 6 and 7.
Figure 9:
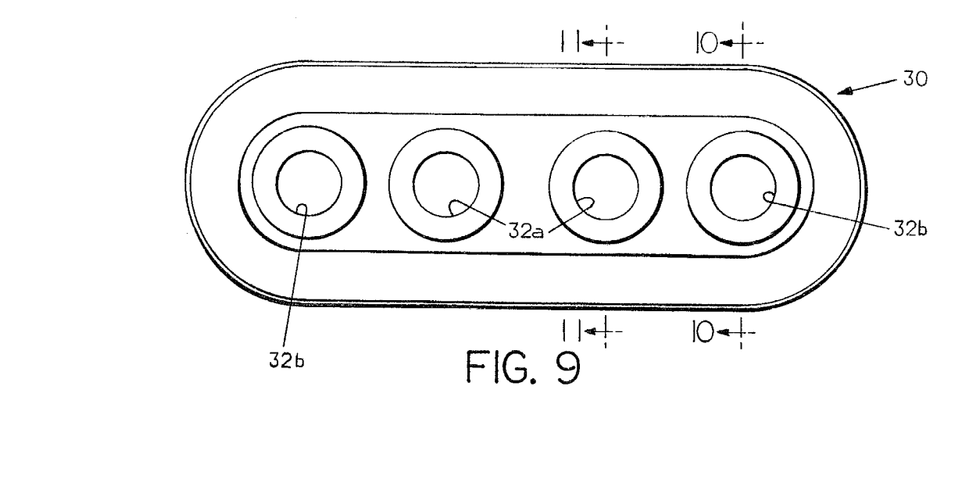
FIG. 9 is a top view of the multiple orifice member of the system shown in FIGS. 6 and 7.
Figure 10:
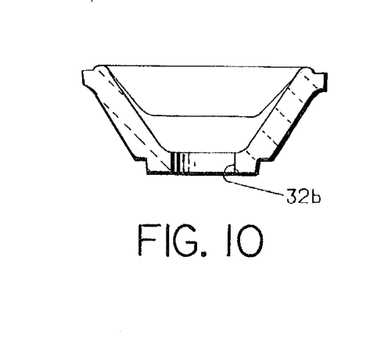
FIG. 10 and 11 are further enlarged, vertical, sectional views of the outboard and inboard orifices, respectively, shown in FIGS. 8 and 9.
Figure 11:
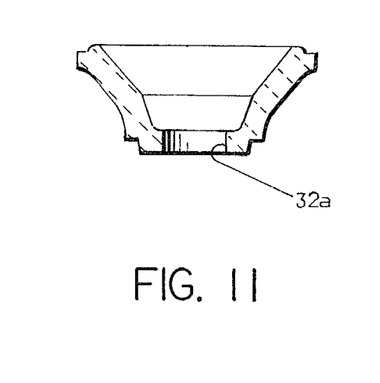

A multiple-opening discharge orifice member 30 is mounted at the lower region of the transitional member, having sufficient horizontal area and complemental shape to cover the elongated slot passageway 22. The orifice member may have from three to six orifice openings in its lower extremity disposed in lineal alignment with elongated slot passageway 22, and is also preferably comprised of refractory material. Where the orifice member has three discharge openings, for example, the openings preferably have precisely-similar diameters and cross-sectional contours and are equi-distance apart. Where the orifice member has four discharge orifices 32, as shown in FIGS. 6 and 9, the openings have precisely-similar diameters and are equi-distant apart, except that the two inboard orifices 32a having a slightly-greater spacing. The two inboard orifices 32a have similar low-rate-of-discharge contours and the two outboard orifices 32b have similar high-rate-of-discharge contours, as also shown in FIGS. 10 and 11.

The combined transitional member 20 and plural opening discharge orifices member 30 have sufficient vertical height to provide a relatively-large head of molten glass over the plural discharge orifices for more positive flow through the outlet openings. Thus, the plurality of molten glass streams are virtually identical in size, shape and viscosity upon emergence from the orifices.

A set of shear blades 40 is mounted in horizontal relation closely adjacent the lower extremity of discharge orifice member 30. The blades are adapted to sever simultaneously the plural glass streams into a plurality of similar glass gobs for delivery to forming apparatus, for example. The blades 40 are mounted in pairs in opposing relation on each arm 41, and two pairs of arms are employed to sever four gobs simultaneously from beneath the discharge orifice member 30.

The aforesaid feeder construction readily lends itself to delivering from three to six glass gobs, all of which are similar within a very narrow range of weight variation. The gobs also exhibit greater accuracy in duplication, having much improved properties of nearly equal size, weight and temperature. Thus, subsequent forming operations using plural glass gobs delivered into multiple cavities are able to produce more uniform manufactured products with fewer or no blemishes.

The method of the present invention may be practiced as follows: Molten glass is delivered from the forehearth 16 into the feeder bowl 11 in refined, thermally-stable condition. The tube 13 is rotated continuously and the plunger 12 is operated in vertical reciprocation, one stroke delivering plural, uniform streams of glass from the discharge orifices ready to be sheared into individual gobs. The glass in the bowl is locally heated as needed or desired by the interiorly-projecting electrodes 17 in order to achieve a thermal balance in the glass mass. The principal heat loss is due to the area of the exposed glass surface, and this area is kept to a minimum by the single tube 13 surrounding the single bowl discharge aperture 18, the aperture and tube interior having complemental diameters. The glass is then delivered through the bottom transitional member 20 from circular to elongated slot passageway. The transition member 20 is locally heated by heaters 25 as needed, or desired, during passage of the glass therethrough. The glass is then delivered to the plural orifices of the elongated discharge orifice member 30, the flow rate being primarily controlled by the vertical stroke of the reciprocatable plunger.

The glass is maintained with considerable head over the discharge orifices. The downwardly diminishing cross-sectional area of the passageway in the transition member 20 permits more positive control of glass flow at all times. The prescribed construction allows improved triple gob operation, and additionally provides for quadruple or greater gobbing for most modern single-section, multiple-cavity forming machines requiring three or more gobs.

The subject spout system permits its being coupled to the glass conditioning section of a conventional forehearth in place of the usual gob feeder and spout. The subject structure is able to accept thermally conditioned glass from the forehearth and maintain or improve upon the thermal uniformity of the glass through the feeder to the final outlet. This is accomplished through increased amounts of insulation which is uniformly placed around the spout system with the means for application of external and internal heating to the glass or refractory material.

The especially-shaped transition member supplies uniformly conditioned molten glass to the especially-shaped elongated orifice member containing the multiple orifice openings. The sum of the areas of the orifice openings is substantially less than the area of the transition member slot area. This maintains a positive head of glass within the delivery system and permits mass flow control with the conventional single feeder tube located in the upper spout area. Individual flow control of each orifice opening is obtained through zonal-type external heating of the transition member so as to control the rate of heat loss and its subsequent effect on resistance to flow at the glass-ceramic interface. Additionally, micro-flow control can be obtained through similar zone heating at the orifice member.

The feeder tube 13 is preferably smaller in diameter than normally used for multiple gob forming and, as stated, is sized to match its interior diameter to the transition member. The smaller tube size further reduces the potential heat loss area. The conventional type single feeder plunger or needle will oscillate within the tube to provide the hydraulic pumping action required for gob shaping. The glass flow configuration with its small surface area, but larger than normal head over the orifice, permits uniform gob forming characteristics at all orifice openings.

The subject glass feeding system is intended for producing multiple uniform gobs of glass for manufacturing high quality products. The system can be further supplemented with other known glass mixing devices, such as rotor segments or blenders mounted in the spout area, as the need exists.

Various modifications may be resorted to within the spirit and scope of the appended claims.

We claim:

1. In a glass feeder having a bowl structure adapted to contain molten glass, a single plunger mounted vertically within said bowl structure for vertical reciprocation, a single cylindrical tube mounted within said bowl structure surrounding said plunger, said tube and plunger adapted to control delivery of the amount of molten glass from said feeder, and a set of shear blades mounted below said feeder for simultaneously separating a plurality of streams of molten glass into molten glass gobs, the improvement comprising a bottom orifice discharge member having a plurality of three or more discharge orifices, a heavy-walled tubular transitional member mounted within a lower region of said feeder bowl structure and above said bottom orifice discharge member, said transitional member having substantial vertical height with a circular passageway configuration at its upper region and an elongated slot passage-way configuration at its lower region in lineal alignment with the major axis of said elongated slot for delivering a plurality of uniform molten glass gobs from said plurality of three or more discharge orifices.

2. The improvement in accordance with claim 1, wherein said heavy-walled transitional member has a progressively decreasing cross-sectional passageway area from its upper to lower regions.

3. The improvement in accordance with claim 1, wherein said bottom orifice discharge member has a lineal series of four generally-similar discharge orifices in its lower region.

4. The improvement in accordance with claim 1, wherein said bottom orifice discharge member has a lineal series of four discharge orifices of equi-diameter at its lower region, the inboard orifices having a low-rate-of-discharge cross-sectional configuration and the outboard orifices having a high-rate-of-discharge cross-sectional configuration.

5. The improvement in accordance with claim 1, wherein said heavy-walled transitional member has a progessively downwardly decreasing cross-sectional passageway area decreasing by about ten percent from its upper to lower extremities to maintain a positive head of molten glass over said discharge orifices.

6. The improvement in accordance with claim 1, said hollow bowl structure has a plurality of electrodes extending into the molten glass above said heavy-walled transitional member, and electrical power means connected to each of said electrodes for direct heating of the molten glass therewithin.

7. The improvement in accordance with claim 1, wherein said heavy-walled transitional member has a series of electrical heaters surrounding its exterior surfaces in a zonal arrangement, and electrical power means connected thereto to control heat loss from said transitional member.

8. The improvement in accordance with claim 1, wherein the hollow bowl member has a relatively small diameter outlet passageway leading into said tubular transitional member, the single plunger, and the surrounding single cylindrical tube mounted within said hollow bowl member serving to combinedly minimize the area of exposure for minimal heat loss from the surface of the molten glass contained within said bowl member.

9. The improvement in accordance with claim 1, wherein said tubular transitional member in its transition downwardly from circular passageway to elongated slot passageway has sufficient vertical height to limit the maximum angular slope to not greater than about 15 degrees from vertical.

10. The improvement in accordance with claim 1, wherein the elongated slot passageway at the lower region of said tubular transitional member has internal length and width to provide coverage of said bottom orifice discharge member having a plurality of three or more discharge orifices.

11. The improvement in accordance with claim 1, wherein said bottom orifice discharge member has a plurality of generally similar-diameter discharge orifices in lineal alignment ranging from three to six in number.

12. The improvement in accordance with claim 1, wherein said bottom orifice discharge member has a series of four equi-diameter discharge orifices in substantially equal spacing, the center-to-center distance of the two inboard orifices being slightly greater.

13. The improvement in accordance with claim 1, wherein said tubular transitional member has sufficient vertical height to provide a relatively-large head of molten glass over the said bottom orifice discharge member for more positive molten glass flow through the plurality of discharge orifices.

14. The improvement in accordance with claim 1, wherein said bottom orifice discharge member has a series of electrical heating elements, each mounted around an individual discharge orifice, to provide independent heat loss control thereat.

15. In a method of delivering multiple molten glass gobs of improved uniformity from a glass feeder system adapted to contain a mass of molten glass, the feeder system including an insulated, thick-walled bowl structure, a single vertically-reciprocatable plunger mounted by a single cylindrical tube, a tubular heavy-walled transitional member mounted in the lower region of said bowl structure, and an elongated bottom discharge orifice member mounted at the lower region of said transitional member having a plurality of discharge orifices, the method including the steps of delivering a mass of molten glass into the bowl structure, locally heating the molten glass within the bowl structure to ensure its thermal uniformity throughout the mass, delivering the molten glass through said tubular transitional member from a circular inlet passageway to an elongated slot outlet passageway and then through the plurality of discharge orifices of said elongated bottom discharge orifice member, the flow rate of the molten glass being primarily controlled by vertical movement of the single, vertically-reciprocatable plunger surrounded by the single cylindrical tube, locally heating the exterior vertical surfaces of said transitional member to control heat transfer through its verying wall thickness and flow resistance of the molten glass therewithin, and periodically shearing the molten glass emitting from the plurality of discharge orifices into multiple molten glass gobs having uniform weight, shape and temperature characteristics.

16. The method in accordance with claim 15, including the step of passing the molten glass downwardly through said tubular transitional member from circular inlet passageway to elongated slot outlet passageway of progressively-diminishing cross-sectional area to maintain a positive head of molten glass over the plurality of discharge orifices.

17. The method in accordance with claim 15, including the step of delivering from three to six molten glass streams from said elongated bottom discharge member to sever from three to six precisely-similar molten glass gobs.

* * * * *